United States Patent
Tsuchiya et al.

(10) Patent No.: US 12,323,069 B2
(45) Date of Patent: Jun. 3, 2025

(54) POWER CONVERSION APPARATUS AND AIR CONDITIONER

(71) Applicant: Mitsubishi Electric Corporation, Tokyo (JP)

(72) Inventors: Atsushi Tsuchiya, Tokyo (JP); Kazunori Hatakeyama, Tokyo (JP); Yuichi Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 18/256,077

(22) PCT Filed: Feb. 16, 2021

(86) PCT No.: PCT/JP2021/005717
§ 371 (c)(1),
(2) Date: Jun. 6, 2023

(87) PCT Pub. No.: WO2022/176015
PCT Pub. Date: Aug. 25, 2022

(65) Prior Publication Data
US 2024/0022182 A1    Jan. 18, 2024

(51) Int. Cl.
*H02M 5/458*    (2006.01)
*H02P 27/06*    (2006.01)
*H02P 27/08*    (2006.01)

(52) U.S. Cl.
CPC ............ *H02M 5/458* (2013.01); *H02P 27/08* (2013.01); *H02P 27/06* (2013.01)

(58) Field of Classification Search
CPC .......... H02M 5/458; H02P 27/06; H02P 27/08
See application file for complete search history.

(56) References Cited

U.S. PATENT DOCUMENTS 9,739,515 B2    8/2017  Kamiya et al.
10,666,143 B2 *  5/2020  Sakakibara ......... H02M 7/5395
(Continued)

FOREIGN PATENT DOCUMENTS

JP    2006-325306 A    11/2006
JP    2008-043012 A    2/2008
(Continued)

OTHER PUBLICATIONS

Extended European Search Report dated Apr. 5, 2024 for the corresponding European Patent application No. 21926455.3.
(Continued)

*Primary Examiner* — Jue Zhang
(74) *Attorney, Agent, or Firm* — Posz Law Group, PLC

(57) ABSTRACT

Included are a rectifier circuit that rectifies a first alternating-current voltage; a reactor connected to the rectifier circuit; a capacitor connected to an output end of the rectifier circuit; an inverter that is connected to the capacitor, generates a second alternating-current voltage through operations of a plurality of switching elements, and applies the second alternating-current voltage to a motor including a stator and a rotor; and a control unit that performs operation controls on the plurality of switching elements. The control unit causes the inverter to apply, to the motor, the second alternating-current voltage having a higher frequency than when the motor is in compression operation so as not to rotate the rotor. The application of the high-frequency second alternating-current voltage from the inverter to the motor generates a regenerative current and a current flows to the capacitor due to the regenerative current without impairing the capacitor.

7 Claims, 14 Drawing Sheets

(56) References Cited

U.S. PATENT DOCUMENTS

2015/0244282 A1* 8/2015 Yamashita ............ H02M 5/458
　　　　　　　　　　　　　　　　　　　　　363/35
2017/0237380 A1　8/2017 Hatakeyama

FOREIGN PATENT DOCUMENTS

| JP | 2012-067706 A | 4/2012 |
| WO | 2013/157074 A1 | 10/2013 |
| WO | 2015/162704 A1 | 10/2015 |

OTHER PUBLICATIONS

Office Action dated Jun. 27, 2024 issued in corresponding Australian Patent Application No. 2021428306.
International Search Report of the International Searching Authority mailed Apr. 6, 2021 in corresponding International Application No. PCT/JP2021/005717 (and English translation).

* cited by examiner

POWER CONVERSION APPARATUS AND AIR CONDITIONER

CROSS REFERENCE TO RELATED APPLICATION

This application is a U.S. national stage application of PCT/JP2021/005717 filed on Feb. 16, 2021, the contents of which are incorporated herein by reference.

FIELD

The present disclosure relates to a power conversion apparatus that converts an alternating-current (AC) voltage into a direct-current voltage and further converts the direct-current voltage into an AC voltage. The present disclosure also relates to an air conditioner.

BACKGROUND

With a conventional drive control apparatus that includes an inverter, refrigerant stagnation can occur as a phenomenon in which a liquid refrigerant collects in a compressor for a refrigeration cycle apparatus such as an air conditioner during low-temperature suspension. When the refrigerant stagnation phenomenon has occurred, it causes problems such that a start-up load on the compressor increases and results in impairing the compressor, and a large current flows in the inverter during start-up of the compressor so that the system is determined to be anomalous and the compressor cannot be started.

To address such problems, Patent Literature 1 discloses a technique that a drive control apparatus performs constraining energization control that heats a motor of a compressor through constraining energization to eliminate the refrigerant stagnation phenomenon. The drive control apparatus described in Patent Literature 1 is capable of stably outputting constraining energization with high efficiency to restrain the refrigerant stagnation phenomenon, and also preventing additional cost since a heating component such as a heater is not required. In the drive control apparatus described in Patent Literature 1, switching elements of an inverter undergoes high-frequency switching for the constraining energization, thus generating a motor current in which a reactive power component is dominant due to impedance characteristics of the motor. The motor current regeneratively flows into a capacitor, and the capacitor is charged with this regenerative current as energy.

CITATION LIST

Patent Literature

Patent Literature 1: Japanese Patent Application Laid-open No. 2012-67706

SUMMARY

Technical Problem

Capacitances of capacitors disposed in a latter stage of rectifier circuits in power conversion apparatuses are now reduced for purposes of harmonic improvement, power factor improvement, apparatus downsizing, and others. When a power conversion apparatus with a capacitor having smaller capacitance performs high-frequency switching as in Patent Literature 1, a capacitor is charged with the regenerative current as the energy; however, a smaller amount of energy is stored in the capacitor. Therefore, compared with a power conversion apparatus with larger capacitance of capacitor, in the power conversion apparatus with the smaller capacitance of capacitor, energy is charged faster and a voltage across the capacitor significantly varies. There is a problem in the power conversion apparatus with the smaller capacitance of capacitor in that, when the capacitor is overcharged, a bus voltage that is the voltage across the capacitor increases and may exceed withstand voltages of the capacitor, switching elements of an inverter, and others.

The present disclosure has been made in view of the above, and an object of the present disclosure is to provide a power conversion apparatus that is capable of avoiding an effect on elements that is caused from constraining energization control for getting rid of refrigerant stagnation while avoiding increase in capacitance of a capacitor.

Solution to Problem

In order to solve the above-stated problem and achieve the object, a power conversion apparatus according to the present disclosure includes a rectifier circuit that rectifies a first alternating-current voltage; a reactor connected to the rectifier circuit; a capacitor connected to an output end of the rectifier circuit; an inverter that is connected to the capacitor, generates a second alternating-current voltage through operations of a plurality of switching elements, and applies the second alternating-current voltage to a compressor motor including a stator and a rotor; and a control unit that performs operation controls on the plurality of switching elements. The control unit causes the inverter to apply, to the compressor motor, the second alternating-current voltage having a higher frequency than when the compressor motor is in compression operation so as not to rotate the rotor. The application of the second alternating-current voltage having high-frequency from the inverter to the compressor motor generates a regenerative current and a current flows to the capacitor due to the regenerative current without impairing the capacitor.

Advantageous Effects of Invention

The power conversion apparatus according to the present disclosure has an effect of avoiding an effect on the elements that is caused from constraining energization control for getting rid of refrigerant stagnation, while avoiding increase in capacitance of the capacitor.

DESCRIPTION OF EMBODIMENTS

With reference to the drawings, a detailed description is hereinafter provided of power conversion apparatuses and an air conditioner according to embodiments of the present disclosure.

First Embodiment

Figure 1:
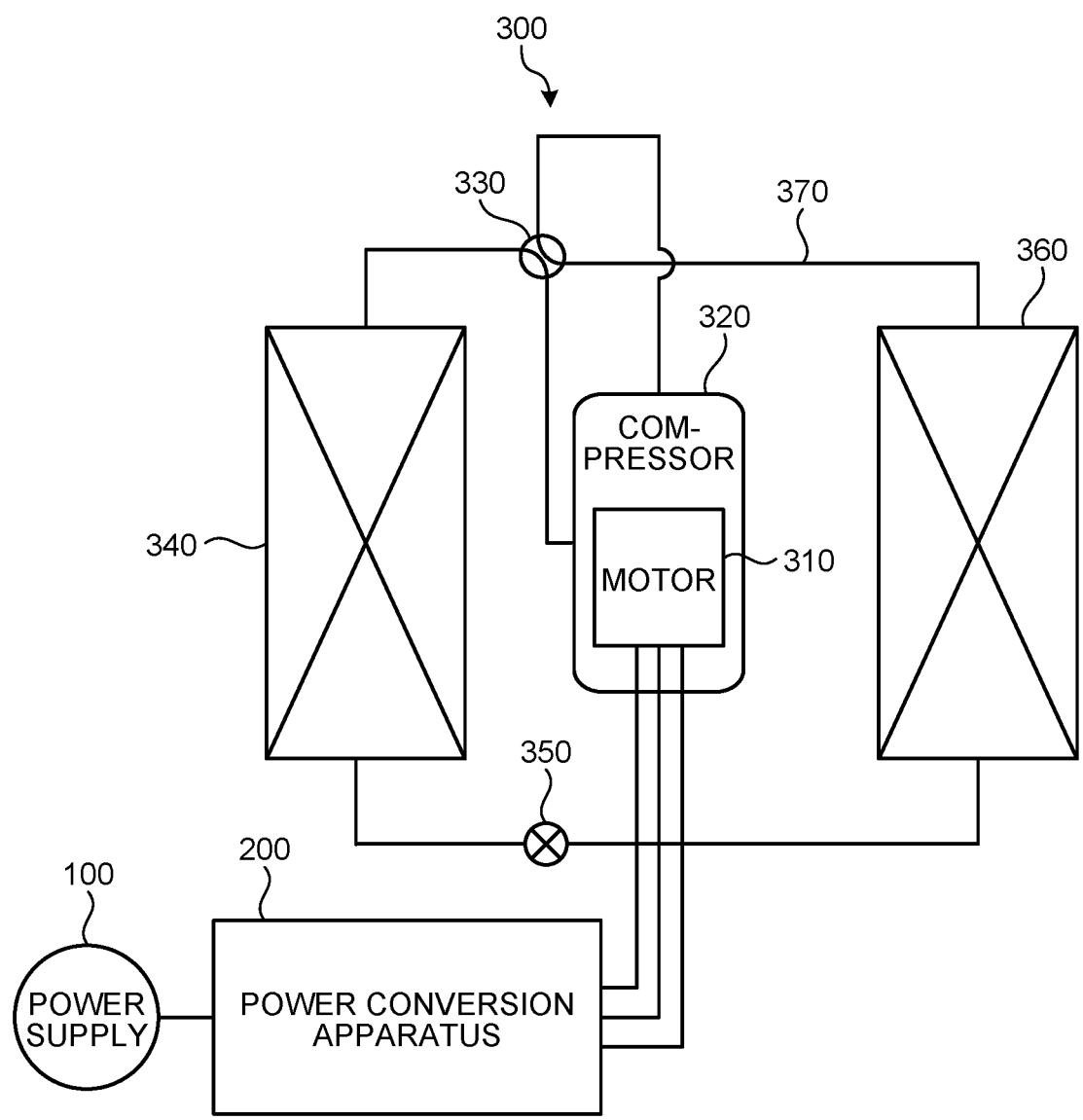
FIG. 1 is a diagram illustrating a configuration example of an air conditioner that includes a power conversion apparatus according to a first embodiment.

FIG. 1 is a diagram illustrating a configuration example of an air conditioner 300 that includes a power conversion apparatus 200 according to a first embodiment. The air conditioner 300 includes a power supply 100, the power conversion apparatus 200, a compressor 320 including a motor 310, a four-way valve 330, an outdoor heat exchanger 340, an expansion valve 350, an indoor heat exchanger 360, and refrigerant piping 370. In FIG. 1, the compressor 320, the four-way valve 330, the outdoor heat exchanger 340, the expansion valve 350, and the indoor heat exchanger 360 are connected via the refrigerant piping 370. The compressor 320 internally includes the motor 310 that runs a compressor mechanism not illustrated. The motor 310 includes a stator and a rotor. The motor 310 is a compressor motor that is driven by input of an alternating-current (AC) voltage that, generated by the power conversion apparatus 200, includes a desired voltage and a desired frequency. As the internal motor 310 of the compressor 320 rotates, a refrigerant is compressed inside the compressor 320 and circulates between the outdoor heat exchanger 340 and the indoor heat exchanger 360 through the refrigerant piping 370. In this way, the air conditioner 300 can control air conditioning. The power conversion apparatus 200 and the motor 310 are electrically connected. The power conversion apparatus 200 is connected to the power supply 100. The power conversion apparatus 200 uses an AC voltage supplied from the power supply 100 to generate the AC voltage to be supplied to the motor 310.

Figure 2:
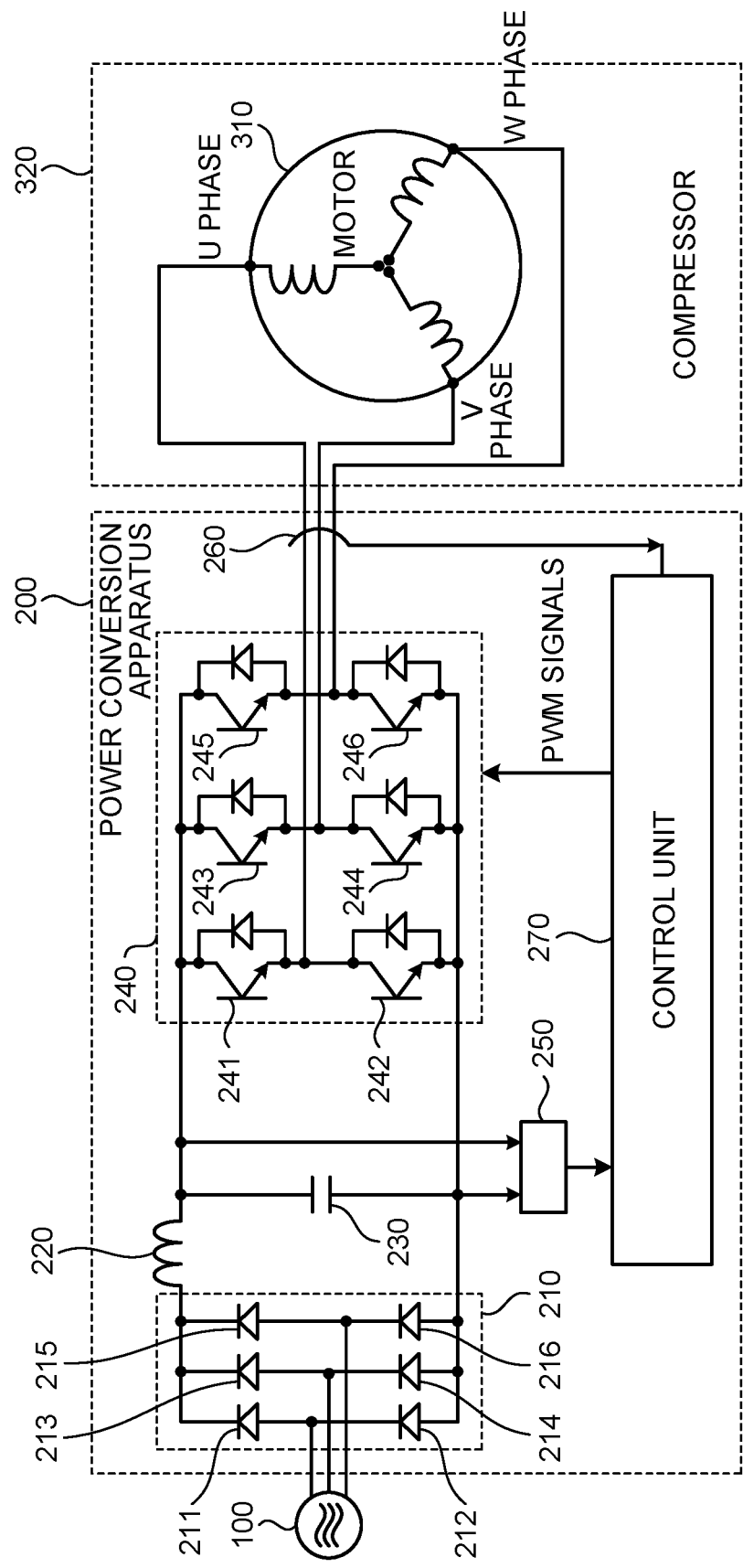
FIG. 2 is a diagram illustrating a first configuration example of the power conversion apparatus according to the first embodiment.

A description is provided of configurations for the power conversion apparatus 200. FIG. 2 is a diagram illustrating a first configuration example of the power conversion apparatus 200 according to the first embodiment. As mentioned earlier, the power conversion apparatus 200 is connected to the power supply 100 and the motor 310, which is included in the compressor 320. FIG. 2 illustrates an example in which the power supply 100 is a three-phase AC power supply. The power conversion apparatus 200 includes a rectifier circuit 210, a reactor 220, a capacitor 230, an inverter 240, a voltage detection unit 250, a current detection unit 260, and a control unit 270. In the power conversion apparatus 200, the rectifier circuit 210, the reactor 220, and the capacitor 230 constitute a converter.

The rectifier circuit 210 includes six diode elements 211 to 216 and rectifies or converts the three-phase AC voltage supplied from the power supply 100 into a direct-current voltage. One end of the reactor 220 is connected to one of output ends of the rectifier circuit 210. One end of the capacitor 230 is connected to the other end of the reactor 220, and the other end of the capacitor 230 is connected to the other one of the output ends of the rectifier circuit 210. In other words, the capacitor 230 is connected to the output end of the rectifier circuit 210 via the reactor 220. The inverter 240 includes a plural of switching elements 241 to 246. The inverter 240 is connected to both of the ends of the capacitor 230 and generates the AC voltage through operations, i.e., on and off operations of the plural switching elements 241 to 246. The inverter 240 applies the generated AC voltage to the motor 310. The voltage detection unit 250 detects a voltage across the capacitor 230, namely a bus voltage Vdc that is input as a direct-current voltage to the inverter 240 and outputs a detection value to the control unit 270. The current detection unit 260 detects currents that flow from the inverter 240 to the motor 310, and outputs detection values to the control unit 270. In the example of FIG. 2, the motor 310 is a three-phase motor having a U phase, a V phase, and a W phase.

The control unit 270 performs operation control on the power conversion apparatus 200 on the basis of the detection values obtained from the voltage detection unit 250 and the current detection unit 260. Specifically, the control unit 270 generates and outputs, to the inverter 240, drive signals that control the operations, i.e., the on and off operations of the switching elements 241 to 246 in the inverter 240, such as PWM signals. Using the PWM signals, the control unit 270 performs the operation control on the inverter 240, that is to say, operation controls on the switching elements 241 to 246. The control unit 270 also obtains an internal temperature of the compressor 320, a refrigerant state, and other information with sensors and other devices that are not illustrated to determine whether or not refrigerant stagnation has occurred. Upon judging that the refrigerant stagnation has occurred while the compressor 320 is stopped, the control unit 270 outputs the PWM signals to the switching elements 241 to 246 of the inverter 240 at a higher frequency than that when the motor 310 causes the compressor 320 to perform normal compression operation. In other words, the control unit 270 causes the inverter 240 to apply, to the motor 310, the AC voltage at a higher frequency than that when the motor 310 is in the compression operation so as not to rotate the rotor in the motor 310. Thus, the inverter 240 can apply the AC voltage having high-frequency to the motor 310 so that the motor 310 is heated to vaporize the refrigerant that blends into oil inside the compressor 320, thereby improving the refrigerant stagnation.

Figure 3:
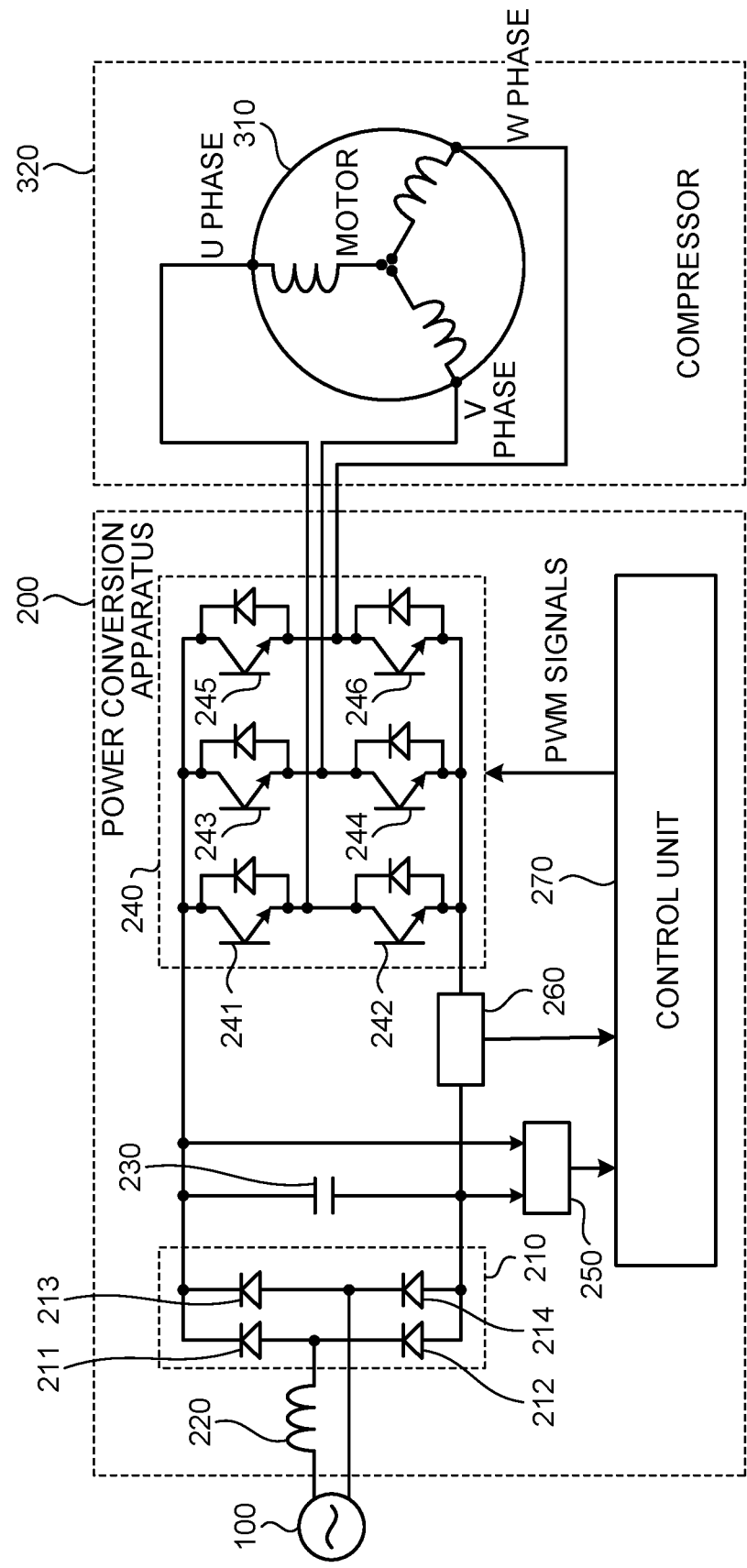
FIG. 3 is a diagram illustrating a second configuration example of the power conversion apparatus according to the first embodiment.

The power supply 100 connected to the power conversion apparatus 200 is the three-phase AC power supply in the example of FIG. 2 but may be a single-phase AC power supply. FIG. 3 is a diagram illustrating a second configuration example of the power conversion apparatus 200 according to the first embodiment. FIG. 3 illustrates an example in which the power supply 100 is the single-phase AC power supply. The rectifier circuit 210 of the power conversion apparatus 200 illustrated in FIG. 3 includes the four diode elements 211 to 214, and rectifies or converts a single-phase AC voltage supplied from the power supply 100 into a direct-current voltage. Moreover, the power conversion apparatus 200 illustrated in FIG. 3 differs from the power conversion apparatus 200 illustrated in FIG. 2 in the installation position of the reactor 220 and the current detection unit 260. No matter what the power supply 100 is, the current detection unit 260 may be disposed either in the position in FIG. 2 or the position in FIG. 3. The power conversion apparatus 200 illustrated in FIG. 3 in which the power supply 100 is the single-phase AC power supply is described below as an example. In the following description, the AC voltage that is supplied from the power supply 100 to the rectifier circuit 210 may be referred to as the first AC voltage, and the AC voltage that is applied from the inverter 240 to the motor 310 may be referred to as the second AC voltage.

Figure 4:
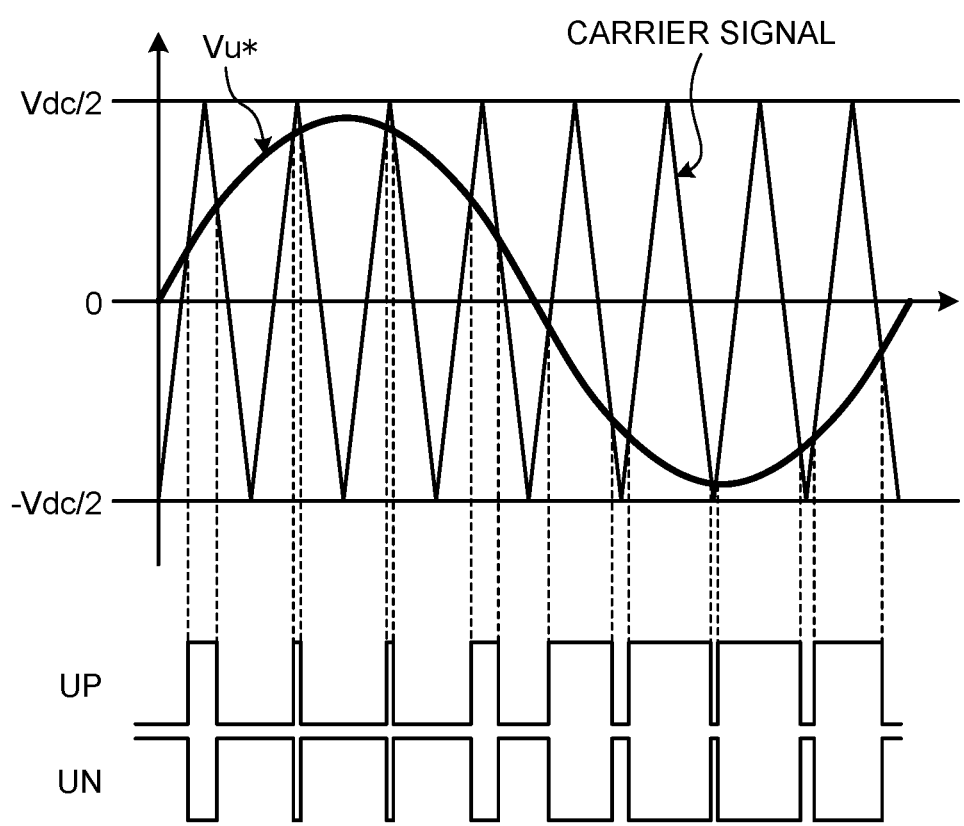
FIG. 4 is a diagram illustrating an example of pulse-width modulation (PWM) signals that a control unit of the power conversion apparatus according to the first embodiment generates.

A description is made for the PWM signals that the control unit 270 of the power conversion apparatus 200 generates. FIG. 4 is a diagram illustrating an example of the PWM signals that the control unit 270 of the power conversion apparatus 200 according to the first embodiment generates. The control unit 270 generates voltage command signals Vu*, Vv*, and Vw* for the phases of the motor 310 on the basis of detection values obtained from the voltage detection unit 250 and the current detection unit 260, and generates the PWM signals UP, VP, WP, UN, VN, and WN for the switching elements 241 to 246 of the inverter 240 on the basis of comparison between the voltage command signals Vu*, Vv*, and Vw* and a carrier signal. FIG. 4 specifically illustrates an example when the control unit 270 generates, for the U phase of the motor 310, the PWM signal "UP" for the switching element 241 and the PWM signal "UN" for the switching element 242 by comparing the voltage command signal Vu* and the carrier signal. "Vdc" in FIG. 4 is the bus voltage Vdc that is detected by the voltage detection unit 250 and is the voltage across the capacitor 230. Using the same method, the control unit 270 is capable of generating the PWM signals "VP" and "VN" for the switching elements 243 and 244 that correspond to the V phase of the motor 310 and the PWM signals "WP" and "WN" for the switching elements 245 and 246 that correspond to the W phase of the motor 310. By causing each of the switching elements 241 to 246 of the inverter 240 to turn on when the corresponding PWM signal is high and to turn off when the corresponding PWM signal is low, the control unit 270 can cause the inverter 240 to generate and apply, to the motor 310, the AC voltage having the desired frequency and the desired voltage value.

A description about capacitance of the capacitor 230 included in the power conversion apparatus 200 is made. In a power conversion apparatus 200 that has a configuration like FIG. 3, a capacitor 230 having a relatively large capacitance is used when the capacitor 230 is used to smooth a direct-current voltage rectified by a rectifier circuit 210 from an AC voltage. Since the power conversion apparatus 200 stores the voltage that has undergone the alternating-to-direct current conversion in the rectifier circuit 210 in the larger-capacitance capacitor 230, the power conversion apparatus 200 provides an inverter 240 with a stable direct-current voltage, thus can supply a constant voltage to be applied to the motor 310. However, when the capacitance of the capacitor 230 is increased for the purpose of smoothing the direct-current voltage, it may result in cost increase and size increase of the power conversion apparatus 200. Moreover, due to a circuit configuration of a capacitor 230 input type, a current that flows through the power supply 100 causes harmonics and a power supply is deteriorated. While the power supply harmonics can be improved when the reactor 220 is made larger in size, it affects cost increase and size increase of the power conversion apparatus 200 even in this case.

If the capacitor 230 is made to have a smaller capacitance to address the above problems, it is possible to reduce cost, downsize the apparatus, improve the power supply harmonics, etc. On the other hand, as the smaller capacitance of the capacitor 230, a smaller amount of energy stored in the capacitor 230. Accordingly, the energy that the capacitor 230 can supply reduces faster if the same amount of energy is required by the inverter 240, the motor 310, or the like. Therefore, there are two supply voltage paths for the inverter 240 in the power conversion apparatus 200 in this case: "the direct-current voltage supplied from the capacitor 230" and "the direct-current voltage rectified from the power supply voltage".

Figure 5:
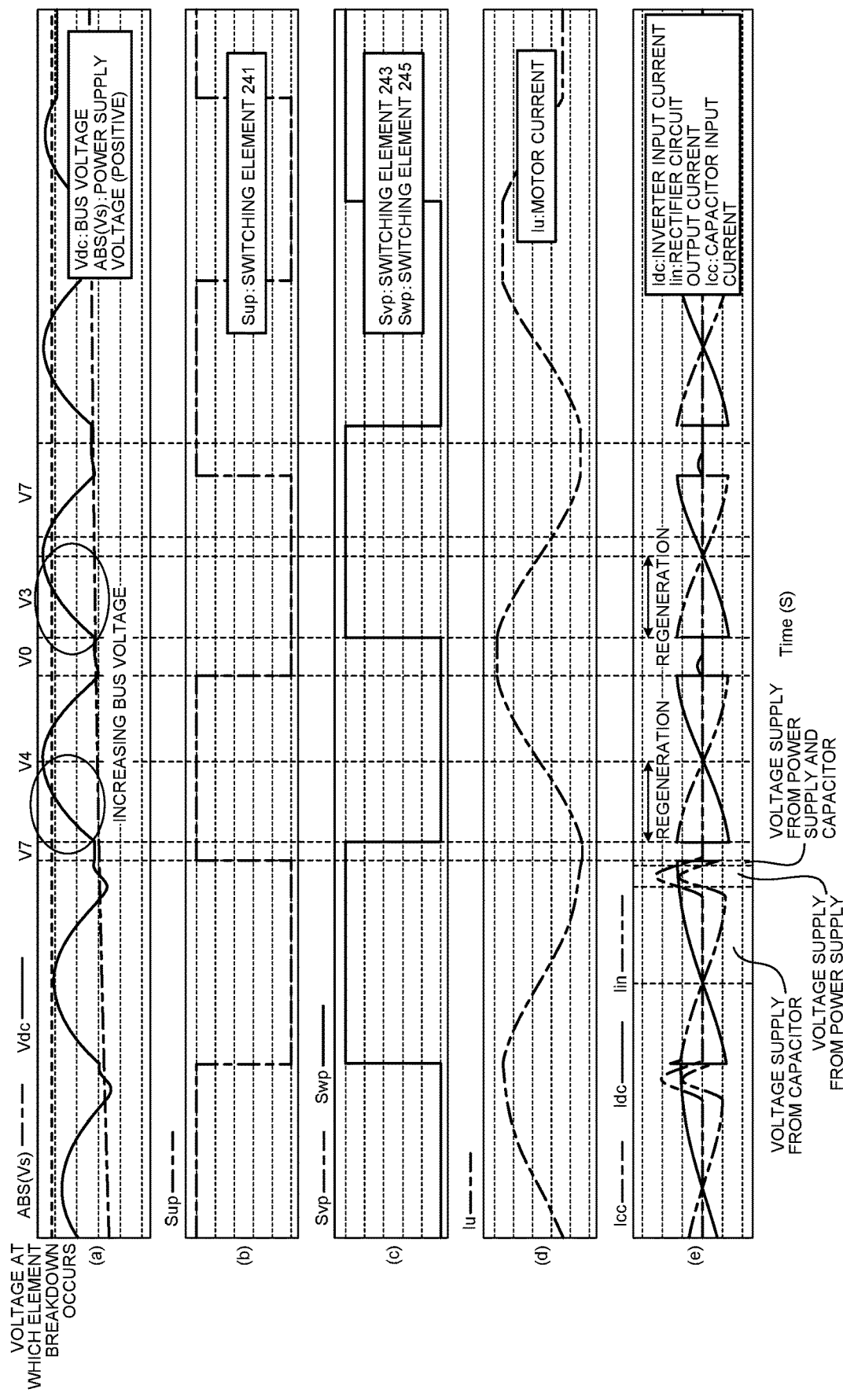
FIG. 5 is a diagram illustrating an example of voltages and currents at parts in relation to switched states of switching elements of an inverter included in the power conversion apparatus according to the first embodiment.

FIG. 5 is a diagram illustrating an example of voltages and currents at parts in relation to switched states of the switching elements 241, 243, and 245 of the inverter 240 included in the power conversion apparatus 200 according to the first embodiment. FIG. 5(a) illustrates the bus voltage Vdc, which is the voltage across the capacitor 230, and the power supply voltage Vs of the power supply 100. FIG. 5(b) illustrates the on-off operation of the switching element 241 that is based on the PWM signal "UP". FIG. 5(c) illustrates the on-off operations of the switching elements 243 and 245 that are based on the PWM signals "VP" and "WP". FIG. 5(d) illustrates the U-phase motor current "Iu" that flows from the inverter 240 to the motor 310. FIG. 5(e) illustrates the inverter input current Idc that is input to the inverter 240, the rectifier circuit output current Iin that is output from the rectifier circuit 210, and the capacitor input current Icc that is input to the capacitor 230. In FIG. 5(e), the inverter input current Idc and the capacitor input current Icc added becomes the rectifier circuit output current Iin. In FIG. 5(e), a section labeled "REGENERATION" is a section where a regenerative current flows from the motor 310 into the capacitor 230. As illustrated in FIG. 5(a), the bus voltage Vdc, which is the voltage across the capacitor 230, increases in the section labeled "REGENERATION".

During constraining energization, in which the switching elements 241 to 246 of the inverter 240 undergoes high-frequency switching under the control of the control unit 270 in the power conversion apparatus 200, that is to say, during motor induction heating, a large amount of reactive current flows due to an inductance component of the motor 310. For the current flowing in the motor 310, there are conditions to flow as the regenerative current into the capacitor 230 depending on the PWM signals for the switching elements 241 to 246 of the inverter 240. For example, if the capacitance of the capacitor 230 is large enough and only the direct-current voltage supplied from the capacitor 230 is the direct-current voltage to be supplied to the inverter 240, the capacitor 230 is charged with the regenerative current through the high-frequency switching, and the voltage across the capacitor 230 that is the bus voltage Vdc does not change significantly. On the other hand, when the capacitance of the capacitor 230 is small and the direct-current voltage for the inverter 240 is supplied through two paths, that is to say, "the direct-current voltage supplied from the capacitor 230" and "the direct-current voltage rectified from the power supply voltage Vs", the energy regeneratively flows into the capacitor 230 after the state of the high-frequency switching shifts from a zero-vector state to a real-vector state until a current polarity is reversed.

The regenerative energy that flows into the capacitor 230 includes energy from power supplied directly from the power supply 100 to the motor 310. In the power conversion apparatus 200, the regenerative current is stored in the capacitor 230 instead of regeneratively flowing to the power supply 100 due to the diode elements 211 to 214 of the rectifier circuit 210, thus the bus voltage Vdc increases in value. For the capacitor 230, particularly if the capacitor 230 has a small capacitance, the bus voltage Vdc may become an excessive value through the regeneration.

The power conversion apparatus 200 according to the present embodiment includes the capacitor 230 having a relatively small capacitance for the purpose of reducing cost, reducing size, ensuring reliability, improving the power supply harmonics, etc. and thus on the assumption that the two supply direct-current voltage paths for the inverter 240 are present, namely "the direct-current voltage supplied from the capacitor 230" and "the direct-current voltage rectified from the power supply voltage Vs". The power conversion apparatus 200 improves the refrigerant stagnation of the compressor 320 by heating the motor 310 through the high-frequency switching of the switching elements 241 to 246 of the inverter 240, and also prevents the voltage across the capacitor 230 from becoming excessive during the high-frequency switching. Specifically, a lower limit is set for the capacitance of the capacitor 230 in the power conversion apparatus 200, and regenerative power is to be consumed by such as a control power supply. On the basis of this configuration, the capacitance of the capacitor 230 is appropriately selected for avoiding breakdowns of the capacitor 230, the switching elements 241 to 246 of the inverter 240, etc. that might be caused from an increase in bus voltage Vdc. The control unit 270 of the power conversion apparatus 200 causes the inverter 240 to generate, with power supplied directly from the rectifier circuit 210 to the inverter 240, the AC voltage having high-frequency. In the power conversion apparatus 200, the high-frequency AC voltage is applied from the inverter 240 to the motor 310 and causes the regenerative current, which results in the current flow to the capacitor 230 without impairing the capacitor 230.

A description is provided about high-frequency switching control that the power conversion apparatus 200 performs to remedy the refrigerant stagnation. On the basis of temperatures of the compressor 320, the outdoor heat exchanger 340, the indoor heat exchanger 360, the refrigerant state, etc., the control unit 270 determines whether or not the refrigerant stagnation has occurred while operation of the compressor 320 is stopped. Upon judging that the refrigerant stagnation has occurred, the control unit 270 causes the inverter 240 to generate the high-frequency AC voltage by using the PWM signals and apply the high-frequency AC voltage to the motor 310. Thus, the control unit 270 heats up the motor 310 inside the compressor 320 by the induction heating due to the inductance component of the motor 310 and heating from copper loss due to a resistance component of the motor 310. As a result, it becomes possible to eliminate the refrigerant stagnation by heating the oil, the refrigerant, etc., inside the compressor 320.

On the basis of the detection values obtained from the voltage detection unit 250 and the current detection unit 260, the control unit 270 generates the voltage command signals Vu*, Vv*, and Vw* for the phases of the motor 310 expressed in equations (1), (2), and (3):

$$Vu^* = A \cos\theta \tag{1}$$

$$Vv^* = A \cos[\theta - 2\pi/3] \tag{2}$$

$$Vw^* = A \cos[\theta + 2\pi/3] \tag{3}$$

The control unit 270 compares the voltage command signals Vu*, Vv*, and Vw*, which have been obtained from equations (1) to (3), to the carrier signal that has a specified frequency and an amplitude Vdc/2 and generates the PWM signals UP, VP, WP, UN, VN, and WN on the basis of a magnitude relation, as illustrated in FIG. 4. The method is not limited to the above method, and the control unit 270 may use two-phase modulation, third-harmonic superposition modulation, spatial vector modulation, or another method to generate the PWM signals UP, VP, WP, UN, VN, and WN.

In the high-frequency switching that remedies the refrigerant stagnation, the control unit 270 operates the switching elements 241 to 246 of the inverter 240 at a higher frequency than an operation frequency for the compression operation to apply the high-frequency AC voltage to the motor 310. The operation frequency for the compression operation is a frequency lower than or equal to 1 kHz. Therefore, it becomes possible for the control unit 270 to efficiently heat up the motor 310 by utilizing iron loss of the motor 310 through application of the high-frequency AC voltage, copper loss caused by the current flowing in windings of the motor 310, etc., without causing rotational torque, vibration, etc., to the motor 310. When the motor 310 is heated, the liquid refrigerant stagnating in the compressor 320 is heated and vaporizes, and is discharged out of the compressor 320. When such refrigerant discharging has made by a specified amount or has taken place for a specified time, the control unit 270 determines whether or not the state has restored to a normal state from a stagnation state and upon judging that the state has restored to the normal state, completes the heating of the motor 310.

Furthermore, when the control unit 270 sets the frequency of the high-frequency AC voltage to be applied from the inverter 240 to the motor 310 at 14 kHz or greater, it is possible to reduce noise because vibration sound of an iron core of the motor 310 becomes almost out of an audible range in this case. In addition, when the motor 310 is an interior permanent magnet motor, a rotor surface crossed by a high-frequency magnetic flux also becomes a part that generates heat, which results in increasing contact area with refrigerant and speedily heating the compressor mechanism. Thus, it is possible to efficiently heat the refrigerant.

Since the power conversion apparatus 200 according to the present embodiment heats the motor 310 by applying the high-frequency AC voltage from the inverter 240, the inductance component increases due to the high frequency and winding impedance increases. Accordingly, the current flowing in the windings of the motor 310 is reduced, and thus the copper loss decreases. On the other hand, the high-frequency AC voltage causes the iron loss, which enables effective heating by the power conversion apparatus

200. Furthermore, since the current flowing in the windings of the motor 310 is small, loss in the inverter 240 is also small and the power conversion apparatus 200 can perform heating with lesser loss.

Figure 6:
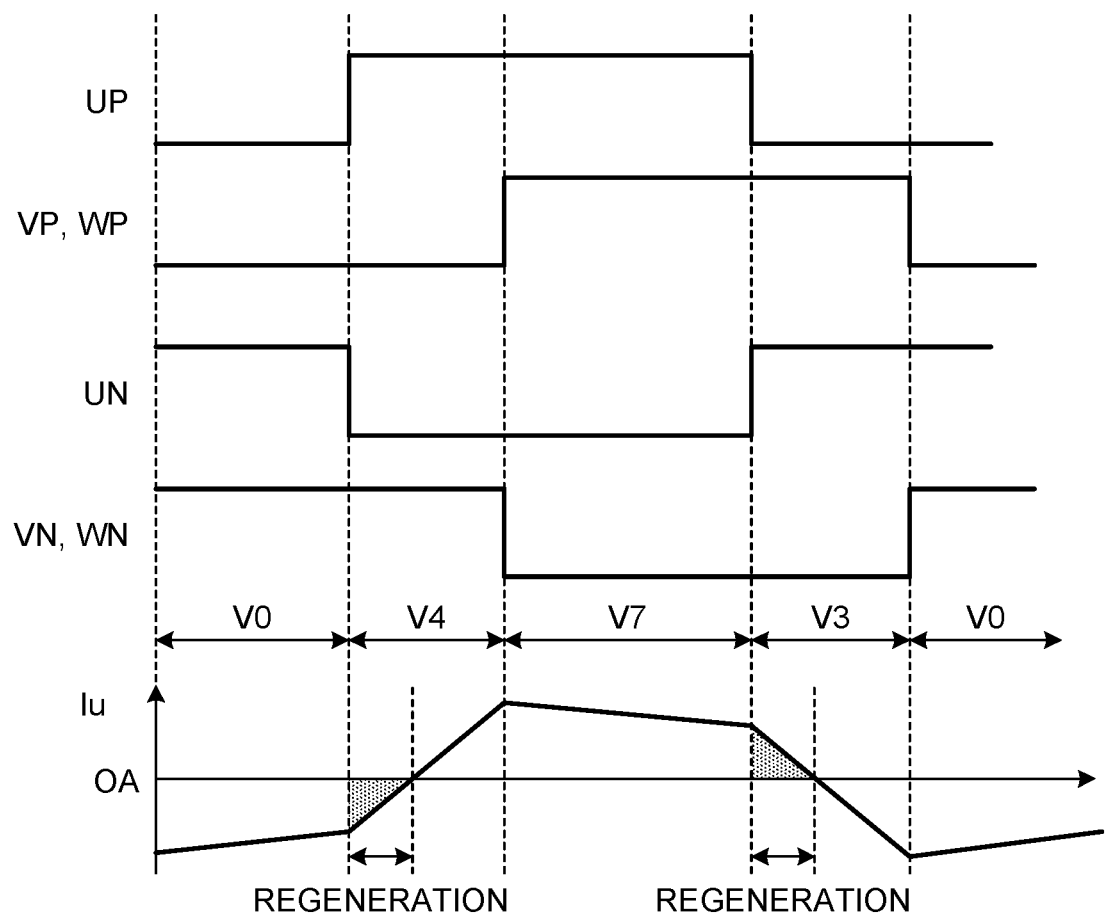
FIG. 6 is a diagram exemplary illustrating those PWM signals for the inverter's switching elements included in the power conversion apparatus according to the first embodiment and a U-phase motor current that flows in a motor.

Next description is about the current and the bus voltage Vdc during the high-frequency switching, in association with the capacitance of the capacitor 230 of the power conversion apparatus 200. Current paths in the power conversion apparatus 200 during the high-frequency switching are explained first. FIG. 6 is a diagram exemplary illustrating the PWM signals UP, VP, WP, UN, VN, and WN for the switching elements 241 to 246 of the inverter 240 included in the power conversion apparatus 200 according to the first embodiment, and the U-phase motor current Iu that flows in the motor 310. A voltage vector changes, depending on the PWM signals that the control unit 270 of the power conversion apparatus 200 generates for the switching elements 241 to 246, in the order illustrated in FIG. 6 as follows: V0(UP=VP=WP=0), V4(UP=1, VP=WP=0), V7(UP=VP=WP=1), V3(UP=0, VP=WP=1), V0(UP=VP=WP=0). As illustrated in FIG. 6, when the V4 vector is applied, the motor current represented as +Iu flows. When the V3 vector is applied, the motor current represented as −Iu flows in the U-phase winding of the motor 310.

As illustrated in FIG. 4, patterns of the V4 and V3 vectors appear during one carrier period (1/fc). Therefore, the power conversion apparatus 200 is capable of generating an AC synchronized with a carrier frequency fc. FIGS. 7 to 12 illustrate the current paths when the voltage vector changes from V0 vector, V4 vector, V7 vector, V3 vector, to V0 vector as illustrated in FIG. 6 in the power conversion apparatus 200.

Figure 7:
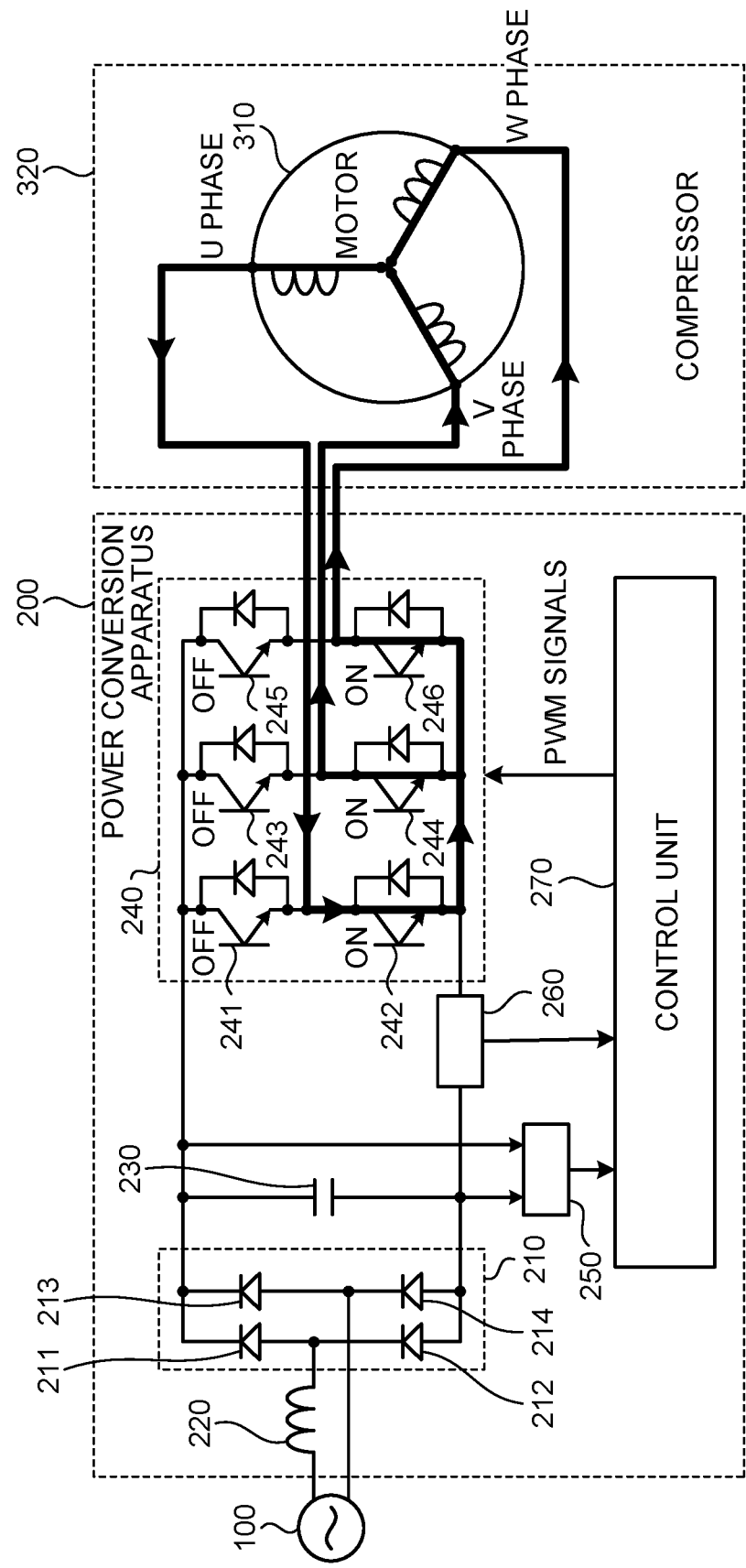
FIG. 7 is a diagram illustrating an example of a current path when the power conversion apparatus according to the first embodiment is in a V0 vector state.

FIG. 7 is a diagram illustrating an example of the current path when the power conversion apparatus 200 according to the first embodiment is in a V0 vector state. For the V0 vector, the PWM signals for the switching elements 241 to 246 of the inverter 240 satisfy UP=VP=WP=0 and UN=VN=WN=1. When the voltage vector is the V0 vector, the current flows between the inverter 240 and the motor 310.

Figure 8:
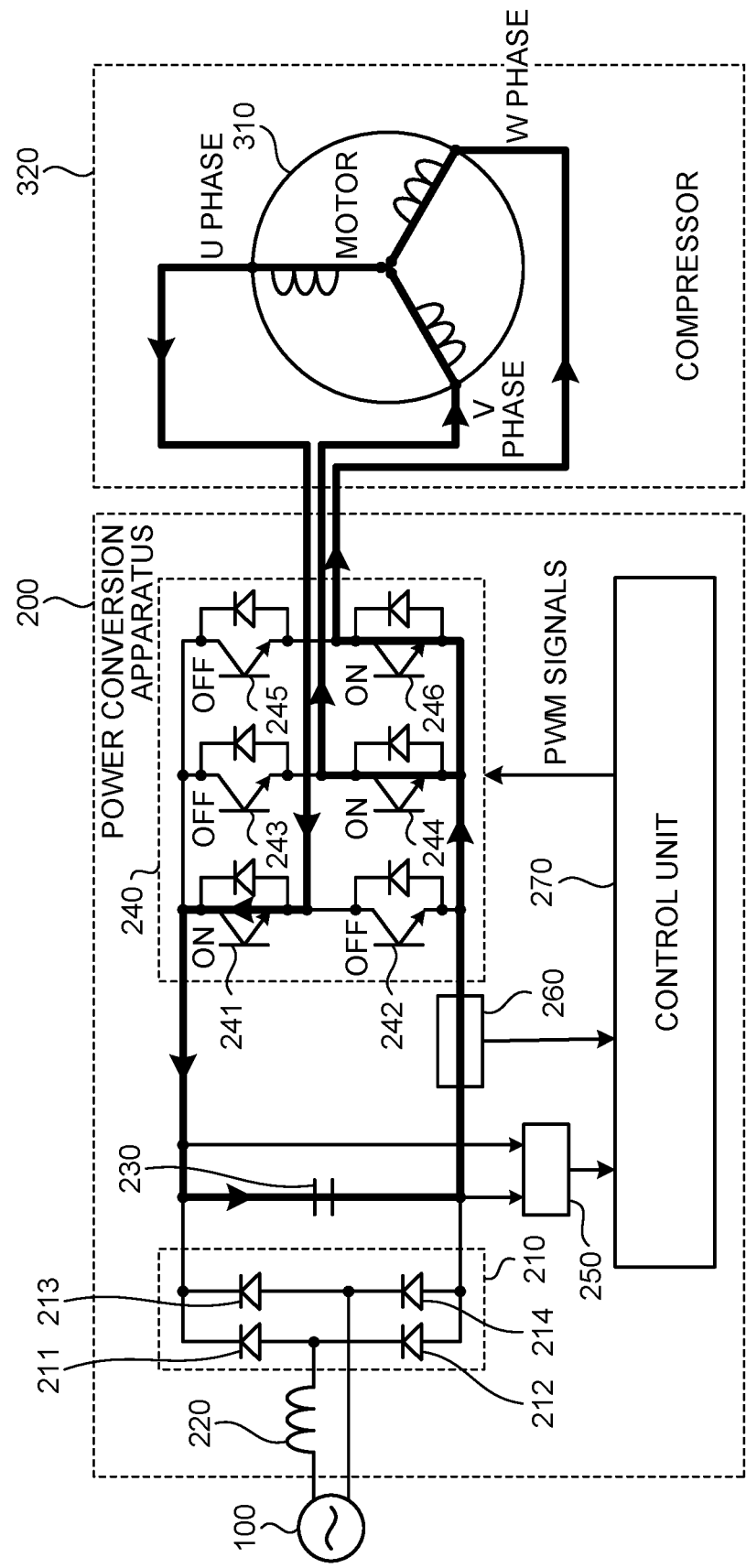
FIG. 8 is a first diagram illustrating an example of a current path when the power conversion apparatus according to the first embodiment is in a V4 vector state.

FIG. 8 is a first diagram illustrating an example of the current path when the power conversion apparatus 200 according to the first embodiment is in a V4 vector state. For the V4 vector, the PWM signals for the switching elements 241 to 246 of the inverter 240 satisfy UP=VN=WN=1 and UN=VP=WP=0. FIG. 8 illustrates the V4 vector state and a regenerative state. In the state of FIG. 8, the regenerative current flows from the U phase of the motor 310 through the switching element 241 to the capacitor 230.

Figure 9:
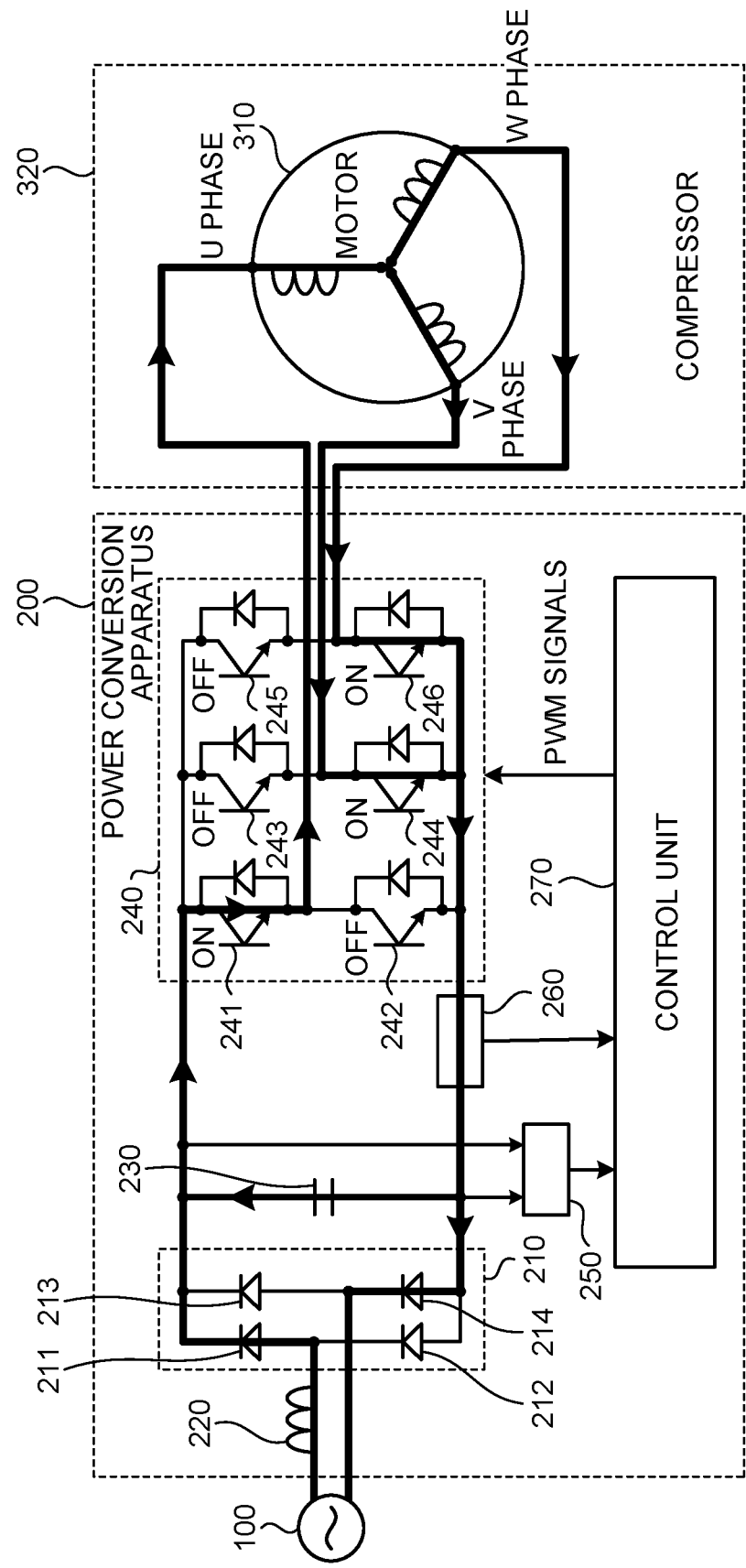
FIG. 9 is a second diagram illustrating an example of a current path when the power conversion apparatus according to the first embodiment is in the V4 vector state.

FIG. 9 is a second diagram illustrating an example of the current path when the power conversion apparatus 200 according to the first embodiment is in the V4 vector state. FIG. 9 illustrates the V4 vector state and a state in which the current flows to the inverter 240 from the power supply 100 through the rectifier circuit 210 as well as from the capacitor 230. In the state of FIG. 9, due to the smaller capacitance of the capacitor 230, a larger amount of current flows from the power supply 100 through the rectifier circuit 210 to the inverter 240, and a smaller amount of current flows from the capacitor 230 to the inverter 240.

Figure 10:
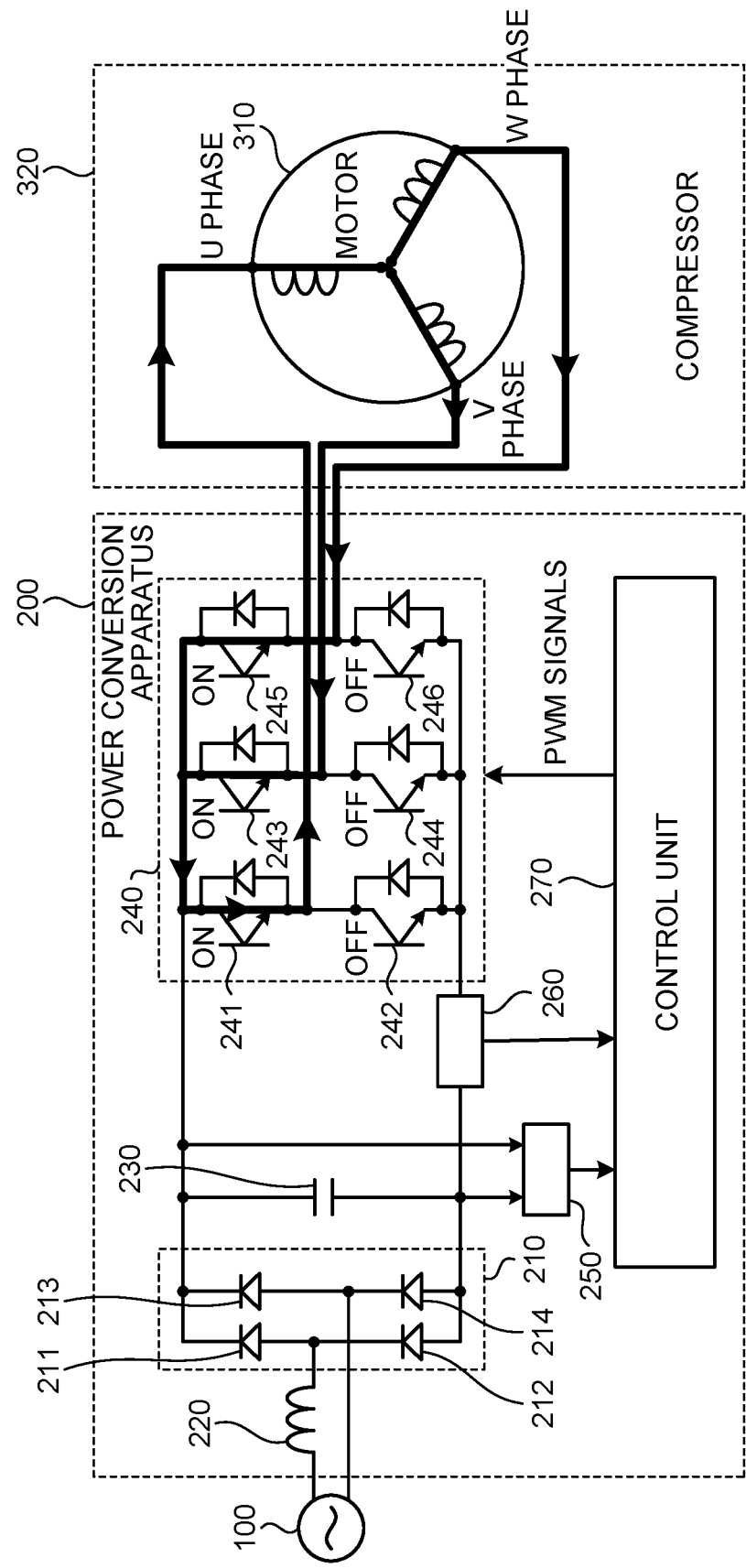
FIG. 10 is a diagram illustrating an example of a current path when the power conversion apparatus according to the first embodiment is in a V7 vector state.

FIG. 10 is a diagram illustrating an example of the current path when the power conversion apparatus 200 according to the first embodiment is in a V7 vector state. For the V7 vector, the PWM signals for the switching elements 241 to 246 of the inverter 240 satisfy UP=VP=WP=1 and UN=VN=WN=0. When the voltage vector is the V7 vector, the current flows between the inverter 240 and the motor 310.

Figure 11:
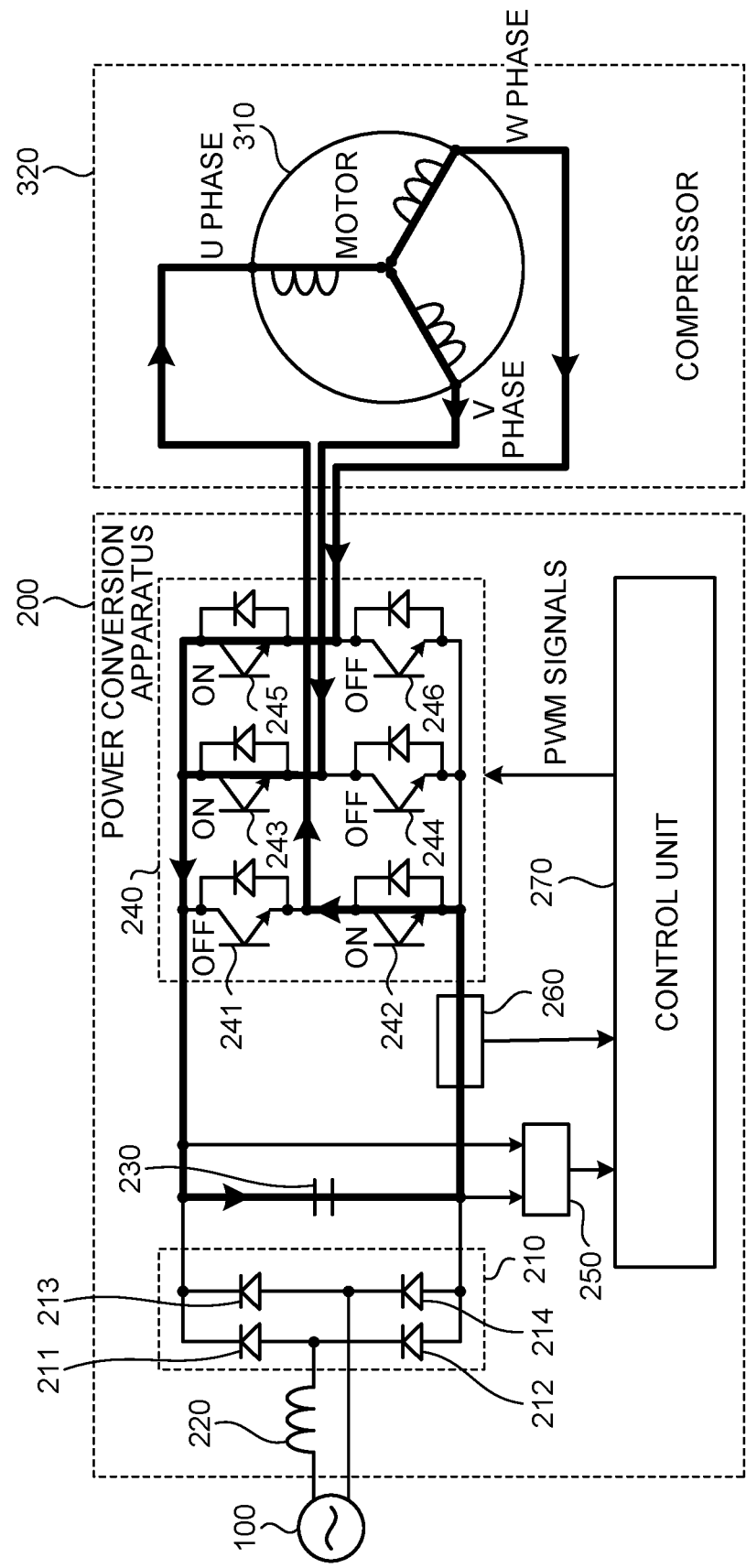
FIG. 11 is a first diagram illustrating an example of a current path when the power conversion apparatus according to the first embodiment is in a V3 vector state.

FIG. 11 is a first diagram illustrating an example of the current path when the power conversion apparatus 200 according to the first embodiment is in a V3 vector state. For the V3 vector, the PWM signals for the switching elements 241 to 246 of the inverter 240 satisfy UP=VN=WN=0 and UN=VP=WP=1. FIG. 11 illustrates the V3 vector state and a regenerative state. In the state of FIG. 11, the regenerative current flows from the V phase and the W phase of the motor 310 through the switching elements 243 and 245 to the capacitor 230.

Figure 12:
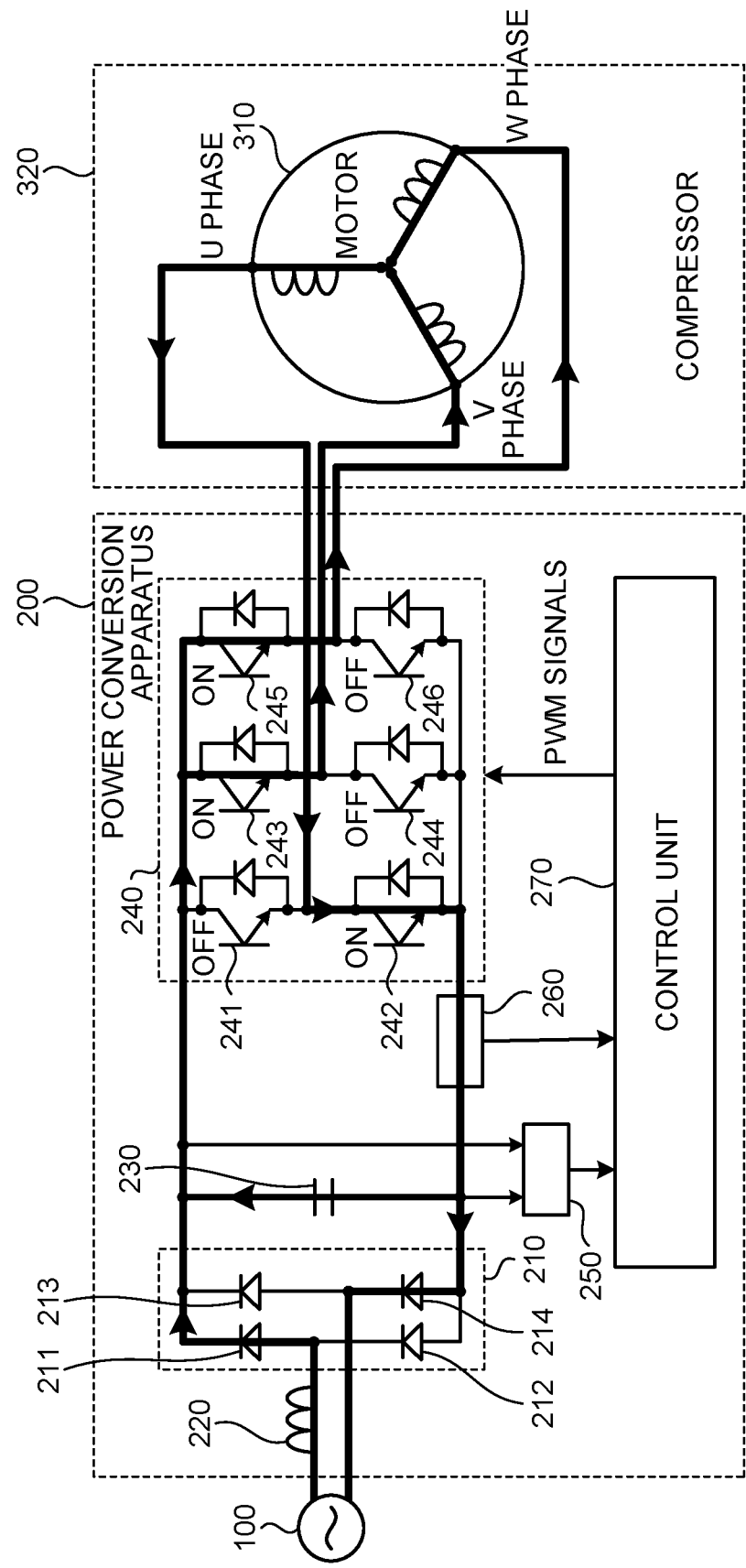
FIG. 12 is a second diagram illustrating an example of a current path when the power conversion apparatus according to the first embodiment is in the V3 vector state.

FIG. 12 is a second diagram illustrating an example of the current path when the power conversion apparatus 200 according to the first embodiment is in the V3 vector state. FIG. 12 illustrates the V3 vector state and a state in which the current flows to the inverter 240 from the power supply 100 through the rectifier circuit 210 as well as from the capacitor 230. In the state of FIG. 12, due to the smaller capacitance of the capacitor 230, a larger amount of current flows from the power supply 100 through the rectifier circuit 210 to the inverter 240, and a smaller amount of current flows from the capacitor 230 to the inverter 240.

As the high-frequency AC voltage, a positive voltage and a negative voltage are alternately applied from the inverter 240 to the motor 310. Between application of the positive voltage and the negative voltage, lines of the motor 310 are short-circuited. The regenerative current generates in the power conversion apparatus 200 according to the present embodiment when the high-frequency AC voltage is generated from an input voltage to the inverter 240 and is applied to the motor 310, as represented for the V4 vector illustrated in FIG. 8 and the V3 vector illustrated in FIG. 11. Specifically, with the high-frequency AC voltage output in the state of V4 and V3 vectors that are real vectors, the regenerative current flows from the motor 310 to the capacitor 230 until the current polarity reverses. As mentioned earlier, if the power conversion apparatus 200 has the capacitor 230 having larger-capacitance, the regenerative current as the charge current for the capacitor 230 causes the voltage across the capacitor 230 to rise gradually. However, as the capacitance of the capacitor 230 of the power conversion apparatus 200 becomes smaller, a rate of change of the voltage across the capacitor 230 or the bus voltage Vdc increases, even for the same regenerative current. The rate of change ΔVcc of the voltage across the capacitor 230 is expressed by equation (4).

$$\Delta Vcc = 1/C \times (i \ast dt) \qquad (4)$$

In equation (4), C is the capacitance of the capacitor 230, and i is the current that flows to the capacitor 230. As equation (4) shows, even for the same regenerative current that flows to the capacitor 230, the voltage across the capacitor 230 becomes about 1000 times greater when the capacitance C of the capacitor 230 is reduced, for example, by a factor of 1000. If the voltage across the capacitor 230 increases and exceeds a design withstand voltage of the capacitor 230, it poses a risk of breaking the capacitor 230. When a capacitor 230 having a greater withstand voltage is used, cost of the power conversion apparatus 200 may increase. As mentioned earlier, the voltage across the capacitor 230 refers to the bus voltage Vdc that is the input voltage for the inverter 240. If increased, the bus voltage Vdc may exceed a withstand voltage of the inverter 240. Similarly to the capacitor 230, introducing switching elements with greater withstand voltages causes increase in the cost of the power conversion apparatus 200.

Therefore, the capacitance of the capacitor 230 used in the power conversion apparatus 200 according to the present embodiment is configured to have a capacitance that is capable of fully absorbing the energy during the regenerative-current generation, namely energy per phase ($\frac{1}{2}*L*i^2$) that is held by the inductance component of the motor 310. It is to be noted that L is inductance in the inductance component of the motor 310. With the capacitance of the capacitor 230 used in the power conversion apparatus 200 being specifically greater than or equal to 10 uF, it is possible to reduce cost and size of the power conversion apparatus 200, etc., while the breakdowns of the elements used in the power conversion apparatus 200 are avoided. Taking FIG. 5(a) as an example, the power conversion apparatus 200 is configured such that the bus voltage Vdc does not exceed a voltage at which the element breakdown occurs even if the bus voltage Vdc increases. With the capacitance of the capacitor 230 used being smaller than or equal to 150 uF, the power conversion apparatus 200 can also obtain an effect of improving power factor in relation to harmonic. Consequently, for the power conversion apparatus 200, it is possible to reduce cost and size of the power conversion apparatus 200, etc. while the breakdowns of the elements used in the power conversion apparatus 200 are avoided, and further obtain the effect of improving power factor in relation to harmonics. The capacitor 230 is thus configured to have the capacitance that prevents a rated voltage from being exceeded due to power supplied from the motor 310 when the switching elements 241 to 246 are in operation to apply the high-frequency AC voltage from the inverter 240 to the motor 310. Moreover, the capacitance of the capacitor 230 is set so that a power can be directly supplied from the rectifier circuit 210 to the inverter 240.

Figure 13:
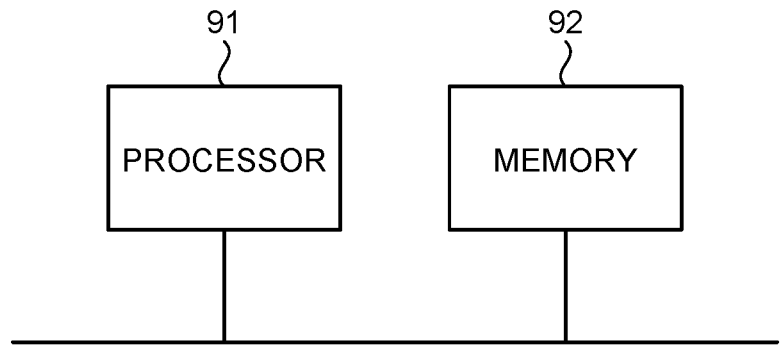
FIG. 13 is a diagram illustrating an example of a hardware configuration that implements the control unit of the power conversion apparatus according to the first embodiment.

Next, a hardware configuration of the control unit 270 included in the power conversion apparatus 200 is described. FIG. 13 is a diagram illustrating an example of the hardware configuration that implements the control unit 270 of the power conversion apparatus 200 according to the first embodiment. The control unit 270 is implemented with a processor 91 and a memory 92.

The processor 91 is a central processing unit (CPU) (also referred to as a processing unit, an arithmetic unit, a microprocessor, a microcomputer, a processor, or a digital signal processor (DSP)) or a system large-scale integration (LSI). The memory 92 is, for example, a nonvolatile or volatile semiconductor memory such as a random-access memory (RAM), a read-only memory (ROM), a flash memory, an erasable programmable read-only memory (EPROM), or an electrically erasable programmable read-only memory (EE-PROM) (registered trademark). The memory 92 is not limited to these and may be a magnetic disk, an optical disk, a compact disk, a mini disk, or a digital versatile disc (DVD).

As described above, when the refrigerant stagnation has occurred in the compressor 320 used in the air conditioner 300, etc. the power conversion apparatus 200 according to the present embodiment is capable of remedying the refrigerant stagnation by having the inverter 240 apply, to the motor 310, the AC voltage having the high frequency than in the compression operation. Moreover, the capacitance of the capacitor 230 in the power conversion apparatus 200 is configured to be small but capable of storing the energy generated by the regenerative current that generates and flows to the capacitor 230 when the regenerative current is generated in the motor 310 by the application of the high-frequency AC voltage from the inverter 240 to the motor 310. In this way, the power conversion apparatus 200 can obtain effects such as the cost reduction, the size reduction, the reliability assurance, and the improvement of the power supply harmonics. The power conversion apparatus 200 can also avoid the breakdowns of such as the capacitor 230 and the switching elements 241 to 246 of the inverter 240 caused by the increase of bus voltage Vdc. Thus the power conversion apparatus 200 can avoid the effect on the elements of the power conversion apparatus 200 that is caused from the constraining energization control for getting rid of the refrigerant stagnation, while reducing or preventing increase in capacitance of the capacitor 230.

Second Embodiment

In the first embodiment, the regenerative current caused in the motor 310 has been assumed to flow to the capacitor 230 through the inverter 240. In a second embodiment, it is described that the regenerative current caused in the motor 310 is used for other purposes.

Figure 14:
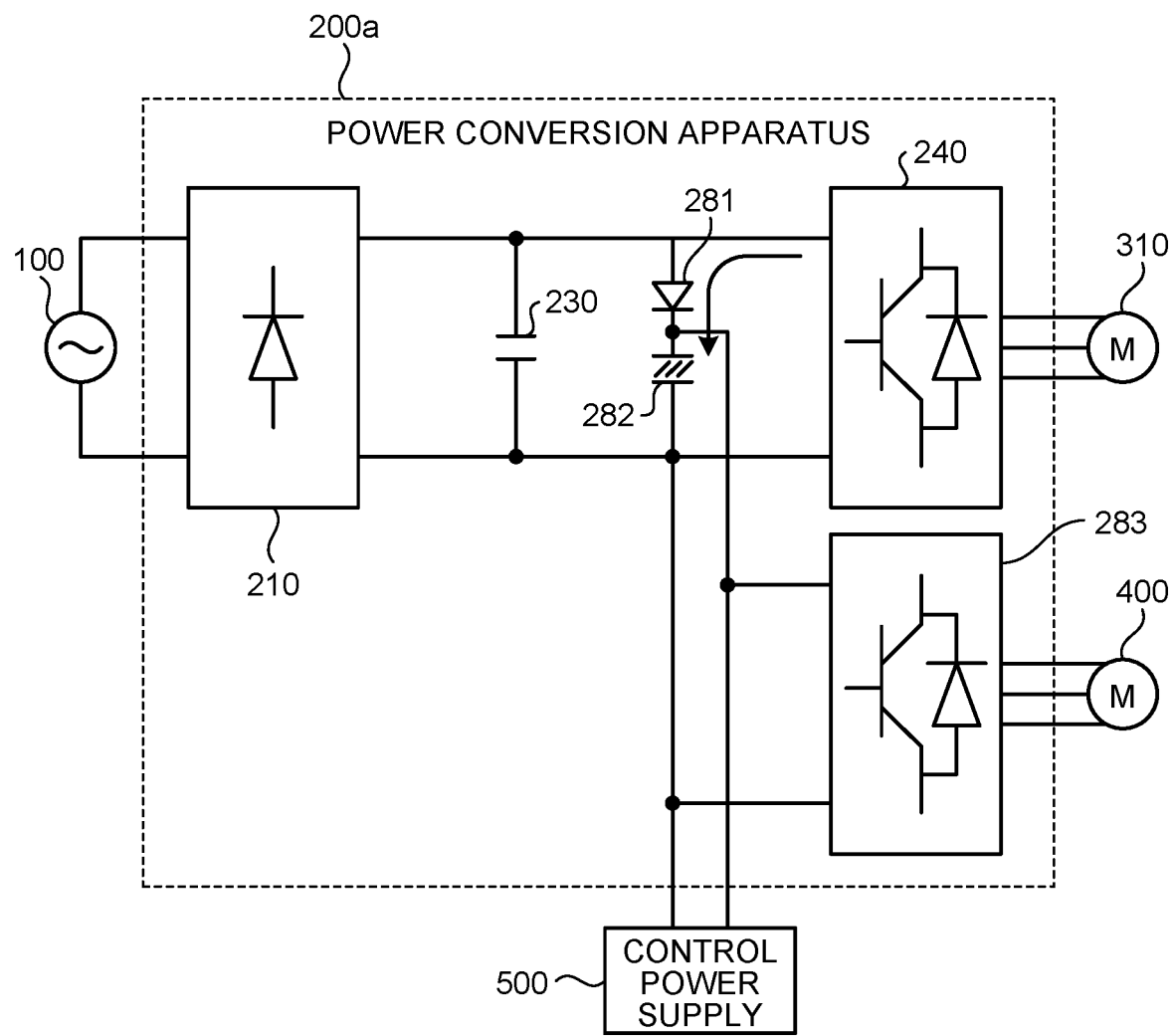
FIG. 14 is a diagram illustrating a configuration example of a power conversion apparatus according to a second embodiment.

FIG. 14 is a diagram illustrating a configuration example of a power conversion apparatus 200a according to the second embodiment. Compared with the power conversion apparatus 200 according to the first embodiment that is illustrated in FIG. 2 or 3, the power conversion apparatus 200a includes a diode element 281, a capacitor 282, and an inverter 283 as additions. While the voltage detection unit 250, the current detection unit 260, and the control unit 270 are omitted in FIG. 14 for simplicity, the power conversion apparatus 200a actually includes the voltage detection unit 250, the current detection unit 260, and the control unit 270.

The power conversion apparatus 200a includes, between the capacitor 230 and the inverter 240 and in parallel with the capacitor 230 and the inverter 240, a circuit in which the diode element 281 and the capacitor 282 are connected in series. In other words, the capacitor 282 for the regenerative current is provided in parallel with input ends of the inverter 240. The power conversion apparatus 200a stores energy in the capacitor 282 with the regenerative current caused in the motor 310, that is to say, charges the capacitor 282. Using power charged in the capacitor 282, the power conversion apparatus 200a can control the inverter 283 to drive, for example, a motor 400 that drives a fan (not illustrated) in the air conditioner 300. Furthermore, the power conversion apparatus 200a uses the power charged in the capacitor 282 to generate a control power supply 500 for the air conditioner 300. By using the regenerative current caused in the motor 310 in this way, the power conversion apparatus 200a is capable of reducing increase of the voltage across the capacitor 230, namely the bus voltage Vdc. Capacitance of the capacitor 282 is configured to be greater than or equal to a specified capacitance in relation to the capacitance of the capacitor 230.

While the power conversion apparatus 200a includes the capacitor 282 in addition to the capacitor 230 in this case, it is not limited thereto. The power conversion apparatus 200a may use power charged in the capacitor 230 to drive the motor 400 through control of the inverter 283 or generate the control power supply 500.

Third Embodiment

In the first embodiment, the regenerative current caused in the motor 310 has been assumed to flow to the capacitor 230 through the inverter 240. In a third embodiment, it is described that the regenerative current caused in the motor 310 flows to another circuit.

Figure 15:
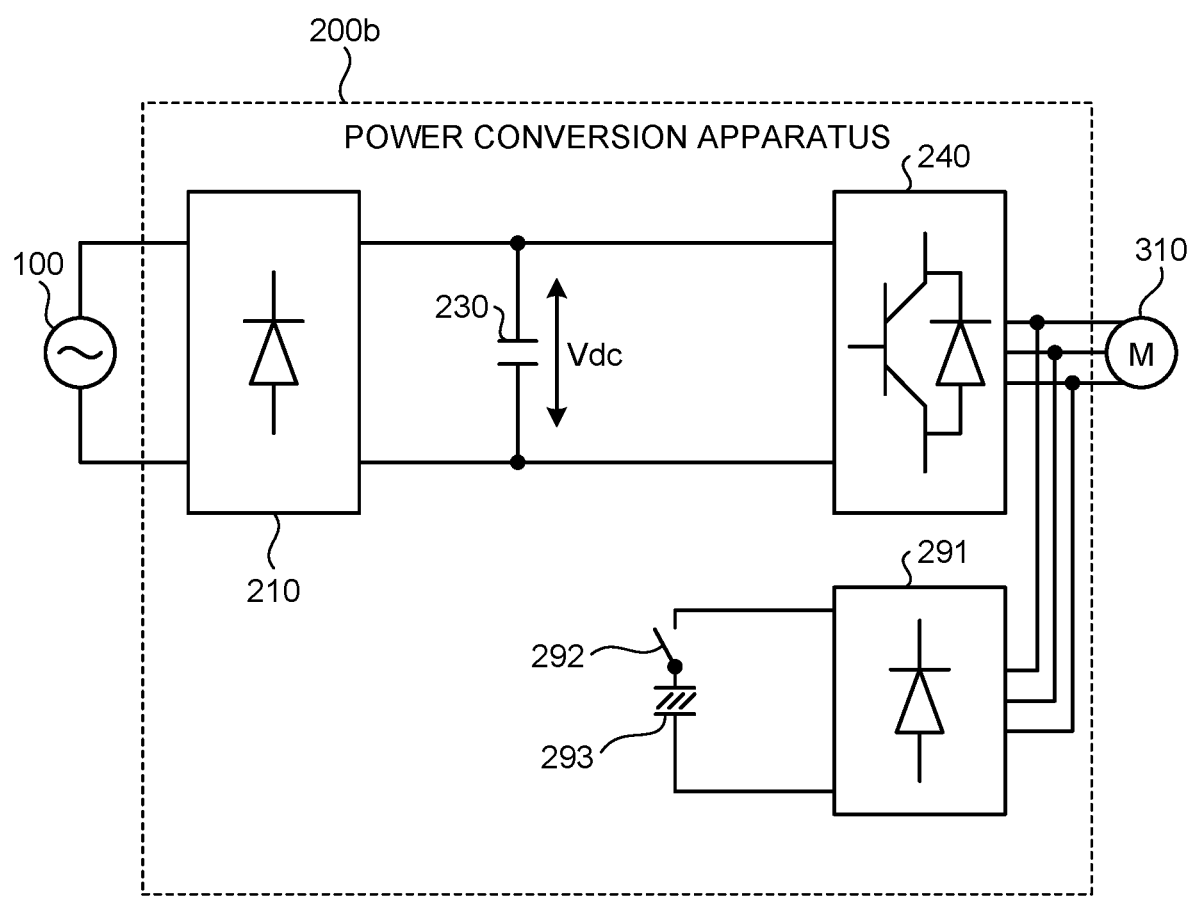
FIG. 15 is a diagram illustrating a configuration example of a power conversion apparatus according to a third embodiment.

FIG. 15 is a diagram illustrating a configuration example of a power conversion apparatus 200b according to the third embodiment. Compared with the power conversion apparatus 200 according to the first embodiment that is illustrated in FIG. 2 or 3, the power conversion apparatus 200b includes a rectifier circuit 291, a switch 292, and a capacitor 293 as additions. While the voltage detection unit 250, the current detection unit 260, and the control unit 270 are omitted in FIG. 15 for simplifying the description, the power conversion apparatus 200b actually includes the voltage detection unit 250, the current detection unit 260, and the control unit 270.

In the power conversion apparatus 200b, the rectifier circuit 291 rectifies the regenerative current caused in the motor 310 to output to the capacitor 293. The control unit 270 controls the switch 292 and has the switch 292 turned on during a period when the capacitor 293 is charged with or absorb the regenerative current and a period when power is supplied from the capacitor 293 through the rectifier circuit 291 to the motor 310. The control unit 270 has the switch 292 turned off during another period. By storing the regenerative current caused in the motor 310 in this way, the power conversion apparatus 200b is capable of reducing increase of the voltage across the capacitor 230, namely the bus voltage Vdc.

Moreover, setting the capacitor 293 at the same capacitance as the capacitor 230 enables cost reduction of the power conversion apparatus 200b, size reduction of the power conversion apparatus 200b, etc.

The above configurations illustrated in the embodiments are illustrative, can be combined with other techniques that are publicly known, and can be partly omitted or changed without departing from the gist. The embodiments can be combined with each other.

REFERENCE SIGNS LIST 100 power supply; 200, 200a, 200b power conversion apparatus; 210, 291 rectifier circuit; 211 to 216, 281 diode element; 220 reactor; 230, 282, 293 capacitor; 240, 283 inverter; 241 to 246 switching element; 250 voltage detection unit; 260 current detection unit; 270 control unit; 292 switch; 300 air conditioner; 310, 400 motor; 320 compressor; 330 four-way valve; 340 outdoor heat exchanger; 350 expansion valve; 360 indoor heat exchanger; 370 refrigerant piping; 500 control power supply.

The invention claimed is:

1. A power conversion apparatus comprising:
a rectifier circuit that rectifies a first alternating-current voltage;
a reactor connected to the rectifier circuit;
a capacitor connected to an output end of the rectifier circuit;
an inverter that generates a second alternating-current voltage through operations of a plurality of switching elements and applies the second alternating-current voltage to a compressor motor including a stator and a rotor, the inverter being connected to the capacitor; and
a processor that performs operation controls on the plurality of switching elements, wherein
the processor causes the inverter to apply, to the compressor motor, the second alternating-current voltage having a higher frequency than when the compressor motor is in compression operation so as not to rotate the rotor, and
a regenerative current generates when the high-frequency second alternating-current voltage is applied from the inverter to the compressor motor and a current flows to the capacitor due to the regenerative current without impairing the capacitor, wherein
a regenerative current flows from the compressor motor to the capacitor until a current polarity reverses while the high-frequency second alternating-current voltage is output in a state of real vector.

2. The power conversion apparatus according to claim 1, wherein
the processor causes the inverter to generate the high-frequency second alternating-current voltage with power supplied directly from the rectifier circuit to the inverter.

3. The power conversion apparatus according to claim 2, wherein
the capacitor is set at a capacitance to prevent exceeding a rated voltage due to power supplied from the compressor motor when the switching elements are in operation for applying the high-frequency second alternating-current voltage from the inverter to the compressor motor.

4. The power conversion apparatus according to claim 2, wherein
the capacitor is set at a capacitance that enables a power supplying directly from the rectifier circuit to the inverter.

5. The power conversion apparatus according to claim 1, wherein
the high-frequency second alternating-current voltage is applied alternately as a positive voltage and a negative voltage from the inverter to the compressor motor, and lines of the compressor motor are short-circuited between application of the positive voltage and the negative voltage.

6. The power conversion apparatus according to claim 1, comprising
a capacitor for the regenerative current is provided in parallel with an input end of the inverter, the capacitor for the regenerative current having a capacitance set greater than or equal to a specified capacitance.

7. An air conditioner comprising the power conversion apparatus according to claim 1.

* * * * *